(12) United States Patent
Mah

(10) Patent No.: US 10,935,360 B1
(45) Date of Patent: Mar. 2, 2021

(54) METHODS AND DEVICES FOR ESTABLISHING GAP DIMENSIONS

(71) Applicant: James Mah, Las Vegas, NV (US)

(72) Inventor: James Mah, Las Vegas, NV (US)

( * ) Notice: Subject to any disclaimer, the term of this patent is extended or adjusted under 35 U.S.C. 154(b) by 0 days.

(21) Appl. No.: 16/730,812

(22) Filed: Dec. 30, 2019

(51) Int. Cl.
*G01B 5/14* (2006.01)

(52) U.S. Cl.
CPC ..................... *G01B 5/14* (2013.01)

(58) Field of Classification Search
CPC ........................................................ G01B 5/14
USPC ............................................................ 33/613
See application file for complete search history.

(56) References Cited

U.S. PATENT DOCUMENTS

| | | | | |
|---|---|---|---|---|
| 5,471,757 A * | 12/1995 | McDonald | ............... | G01B 3/30 33/199 R |
| 6,931,744 B1 * | 8/2005 | Ikerd, Jr. | ............. | F16D 65/0043 33/501.45 |
| 7,607,237 B2 * | 10/2009 | Schafer | .................... | G01B 3/34 33/501.45 |
| 8,919,004 B2 * | 12/2014 | Wu | ........................ | G01B 21/08 33/501.6 |
| 9,500,462 B2 * | 11/2016 | Reble | .................... | G01B 5/0028 |
| 9,683,826 B2 * | 6/2017 | Cupertino | ................ | G01B 3/30 |
| 2004/0200084 A1 * | 10/2004 | Wang | ........................ | G01B 3/50 33/501.45 |
| 2013/0125407 A1 * | 5/2013 | Shapiro | .................... | G01B 3/04 33/485 |
| 2013/0185950 A1 * | 7/2013 | Oode | ........................ | G01B 7/06 33/783 |
| 2016/0084626 A1 * | 3/2016 | Reble | .................. | F16D 65/0043 33/609 |

* cited by examiner

*Primary Examiner* — Yaritza Guadalupe-McCall

(57) ABSTRACT

Methods, devices, and kits for measuring and establishing a gap between two surfaces are disclosed, which include and involve the use of a plurality of gap-establishing elements. Each gap-establishing element consists of a three-dimensional object having a defined and consistent thickness across an area that spans at least a partial length of the three-dimensional object. In addition, each gap-establishing element is labeled with a number that is correlated with the defined and consistent thickness that applies to such gap-establishing element. The plurality of gap-establishing elements are configured to be stacked upon or combined with each other. Such gap-establishing elements are useful for measuring and establishing gap dimensions that are included within various structures and/or machines (including simple and complex machines).

10 Claims, 9 Drawing Sheets

METHODS AND DEVICES FOR ESTABLISHING GAP DIMENSIONS

FIELD OF THE INVENTION

The field of the present invention relates generally to methods and devices for establishing gap dimensions, particularly methods and devices for establishing gap dimensions that are included within various structures (such as buildings) and/or various machines (including simple and complex machines).

BACKGROUND OF THE INVENTION

Establishing and maintaining precise dimensions between parts and surfaces of a structure or machine—during manufacturing and assembly—is critically important for a number of reasons, such as accommodating for thermal expansion/contraction, addition of coatings (such as primer and paint), incorporation of other components and materials (such as grout between floor tiles), and other functional considerations (such as vibrations and intended movement of the components, e.g., a hinge opening a door or other more complex motions). It is also well-known that inadequate dimensions, and particularly inadequate gap dimensions, e.g., gaps that are too small or large, often produce a number of undesirable results related to quality, durability, longevity, and malfunction of the structure or machine. Historically, gap dimensions have been established through basic visual estimates—or, in some cases, determined more accurately with physical measurements and gap gauges or shims.

Gap dimensions vary among industries and applications, with relative dimensions of gap desirability and acceptance being largely established for and dependent upon each specific application. However, the steps of measuring, establishing, maintaining, comparing, and adjusting gap dimensions often present formidable challenges, particularly in connection with the construction of desired structures and/or assembly of machines (whether simple or complex machines). This problem is compounded by the three-dimensional nature of many components that must be combined in various structures and machines, where multiple surfaces must be simultaneously combined in three-dimensional space.

Using a ruler or gauge to measure and re-measure such gaps is a common practice—but is tedious, time-consuming, and often yields poor results. Likewise, adjustment of the relative positions of components requires re-measurement, which impacts all of the affected surfaces and components. Of course, as the geometry of parts becomes more complex (e.g., in simple and complex machines), these challenges become even more pronounced. Maintenance of specific gap dimensions in one or more areas—while adjusting another—becomes very challenging.

Shims of pre-determined dimensions are commonly used as an alternative to rulers and gauges, insofar as shims are designed to establish, support, and maintain a desired gap dimension. However, shims also have a number of drawbacks. Specifically, shims are not adjustable and, if the gap dimensions need to be adjusted, shims of different dimensions need to be used. As with rulers and gauges, the use of shims can also be tedious and time-consuming. Furthermore, it is often very difficult to rapidly visualize and demonstrate all involved gap dimensions at one time (particularly during machine assembly). In many applications, non-uniform gap dimensions are desired between components. For example, the mechanical coupling of a hood, door, and fender on an automobile require the establishment of different gaps between such parts, which are difficult to visualize and achieve through visual estimates or using currently-available gauges, rulers, or shims.

Accordingly, there is a continuing need for improved methods and devices for rapidly assessing, visualizing, and adjusting gap dimensions between adjacent surfaces, whether in connection with the construction of a physical structure and/or machines (including simple and complex machines). As the following will demonstrate, the methods and devices described herein address such demands (and others) in the marketplace.

SUMMARY OF THE INVENTION

According to certain aspects of the invention, methods, devices, and kits for measuring and establishing a gap between two surfaces are provided, which include and involve the use of a plurality of gap-establishing elements. The invention provides that each gap-establishing element preferably consists of a three-dimensional object having a defined and consistent thickness across an area that spans at least a partial length of the three-dimensional object (or, in some embodiments, across the entire length of the three-dimensional object). In addition, the invention provides that each gap-establishing element is preferably labeled with a number that is correlated with the defined and consistent thickness that applies to such gap-establishing element.

The invention provides that a set (or kit) of the gap-establishing elements described herein may be configured in a number of different ways. For example, in a first embodiment, each of the gap-establishing elements may exhibit an identical thickness across the area that spans at least a partial length of the three-dimensional object, with such gap-establishing elements being configured to be stacked upon or combined with each other (as mentioned below) to achieve various aggregate thicknesses. In another embodiment, the gap-establishing elements may include two or more gap-establishing elements, with at least a first gap-establishing element having a different thicknesses across the area that spans at least a partial length of the three-dimensional object from that of a second gap-establishing element. In other words, the plurality of gap-establishing elements will have different thicknesses. In yet another embodiment, the plurality of gap-establishing elements may include gap-establishing elements having different thicknesses across the area that spans at least a partial length of the three-dimensional object, with each thickness representing a defined relative percentage of a target gap dimension, e.g., 50%, 60%, 70%, 80%, 90%, or 100% of the target gap dimension.

The invention further provides that the plurality of gap-establishing elements are preferably configured to be stacked upon or combined with each other. For example, the gap-establishing elements may be configured to be stacked upon or combined with each other through adhesives; indexed male and female connecting parts; interlocking elements on surfaces of each gap-establishing element to be joined; magnets; or combinations of the foregoing. In addition, the invention provides that each gap-establishing element may be labeled with a machine-readable code (and/or a unique color), such that each unique machine-readable code (and/or color) is correlated with a single defined and consistent thickness of the gap-establishing element.

Such gap-establishing elements are useful for measuring and establishing gap dimensions that are included within various structures and/or machines (including simple and complex machines), such as the various gaps that exist between different components and panels of an automobile.

The above-mentioned and additional features of the present invention are further illustrated in the Detailed Description contained herein.

DETAILED DESCRIPTION OF THE INVENTION

The following will describe, in detail, several preferred embodiments of the present invention. These embodiments are provided by way of explanation only, and thus, should not unduly restrict the scope of the invention. In fact, those of ordinary skill in the art will appreciate upon reading the present specification and viewing the present drawings that the invention teaches many variations and modifications, and that numerous variations of the invention may be employed, used, and made without departing from the scope and spirit of the invention.

Figure 1:
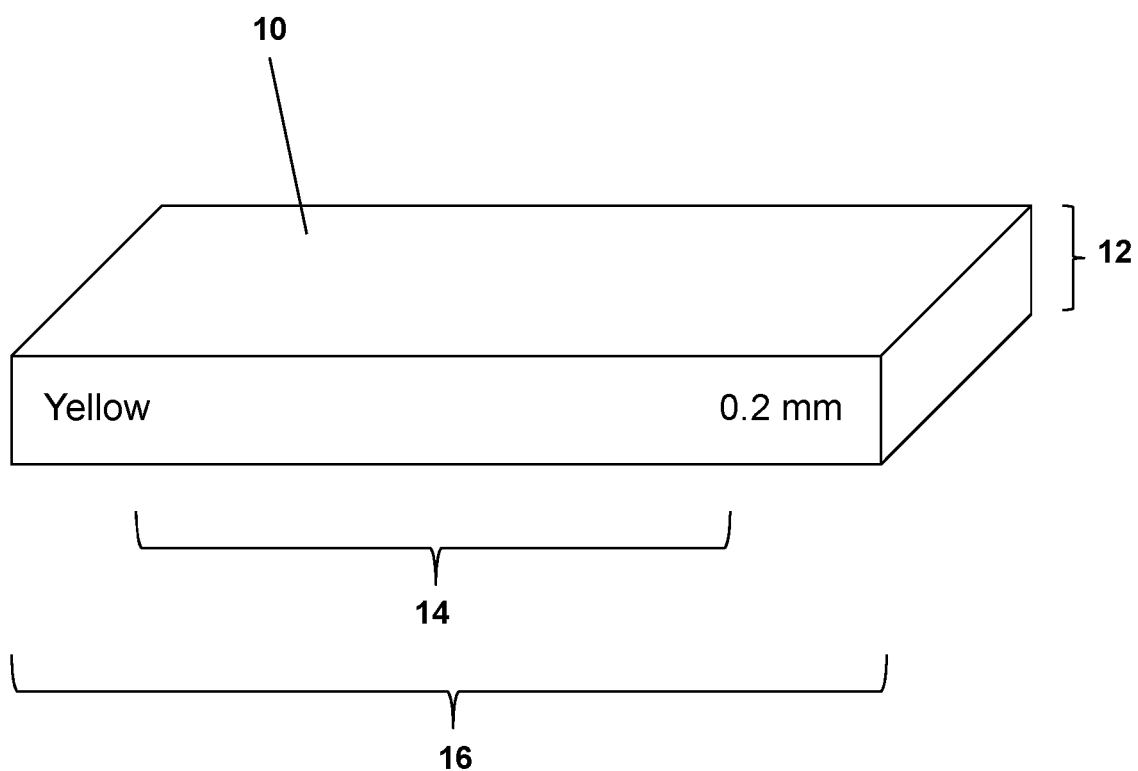
FIG. 1 is a diagram showing a non-limiting example of a gap-establishing element described herein.

Referring now to FIGS. 1-9, according to certain preferred embodiments of the present invention, methods and devices for establishing gap dimensions that are included within various structures and/or machines (including simple and complex machines) are provided. More particularly, the devices (or dimension-establishing kits) of the present invention include a plurality of gap-establishing elements 10, which may comprise layers or rectangular objects of pre-determined thickness. Referring to FIG. 1, in a first embodiment, each gap-establishing element 10 preferably consists of a three-dimensional object having a defined and consistent thickness 12 across an area that spans at least a partial length 14 of the three-dimensional object (or, in some embodiments, across the entire length of the three-dimensional object 16). In such embodiments, the gap-establishing element 10 is configured to be positioned between two surfaces where a desired/target gap should exist, such that the two surfaces may be moved adjacent to each side of the gap-establishing element 10, thereby leaving a gap between the surfaces of a dimension that is the same as the thickness 12 of the gap-establishing element 10.

More particularly, in such embodiments, the gap-establishing elements 10 may be arranged in a stack, such that the gap-establishing elements 10 may be placed between abutting surfaces (and used in the establishment of an aggregate/desired gap dimension between two surfaces or components). Such gap-establishing elements 10 and associated methodology enables rapid assessment of the gaps to be established between surfaces and components, easy visualization of such gaps, and the ability to add or remove gap-establishing elements 10 to aid in adjustment and re-establishment of desired gap dimensions.

Figure 2:
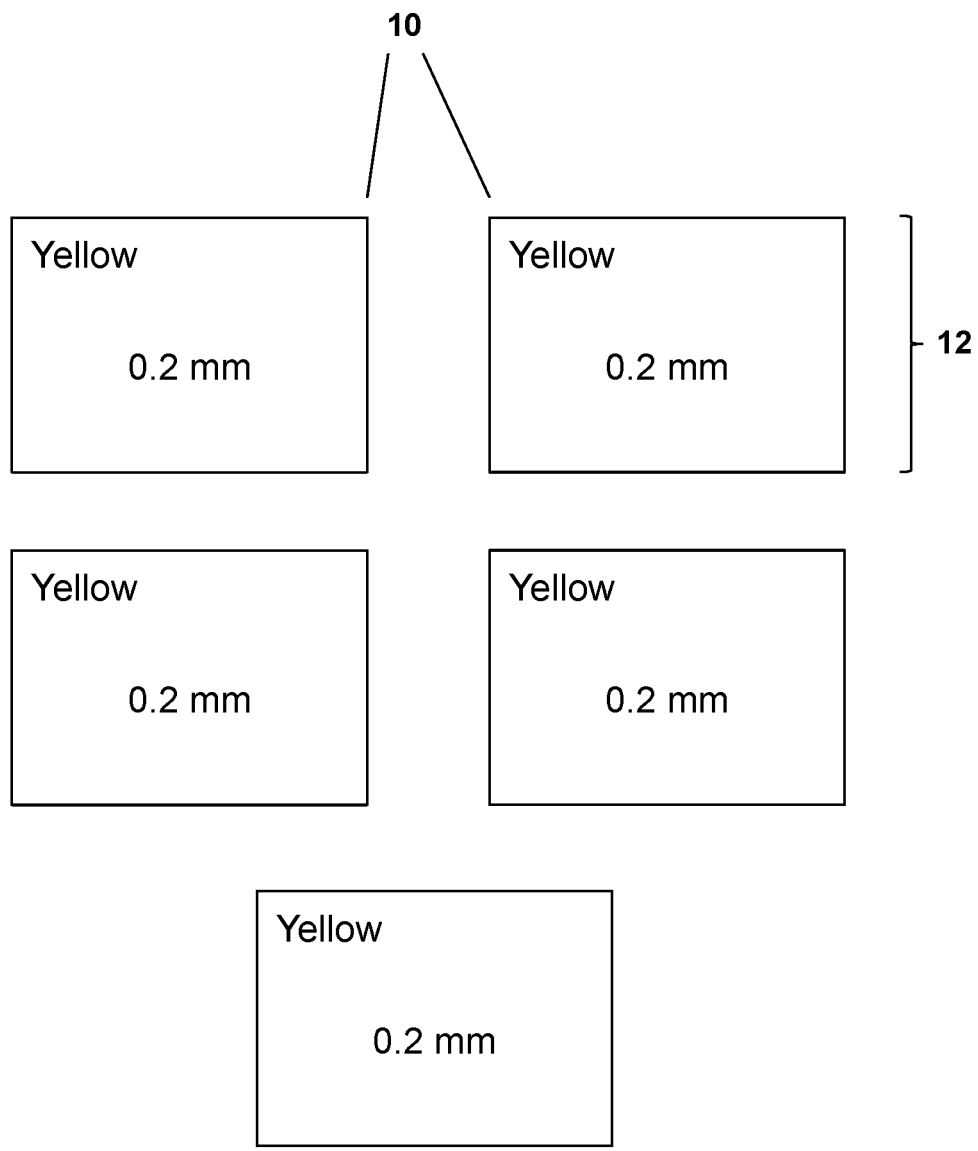
FIG. 2 is a diagram showing a gap-establishing kit described herein, with each kit component (each gap-establishing element) being color-coded and exhibiting the same gap-forming dimension.
Figure 3:
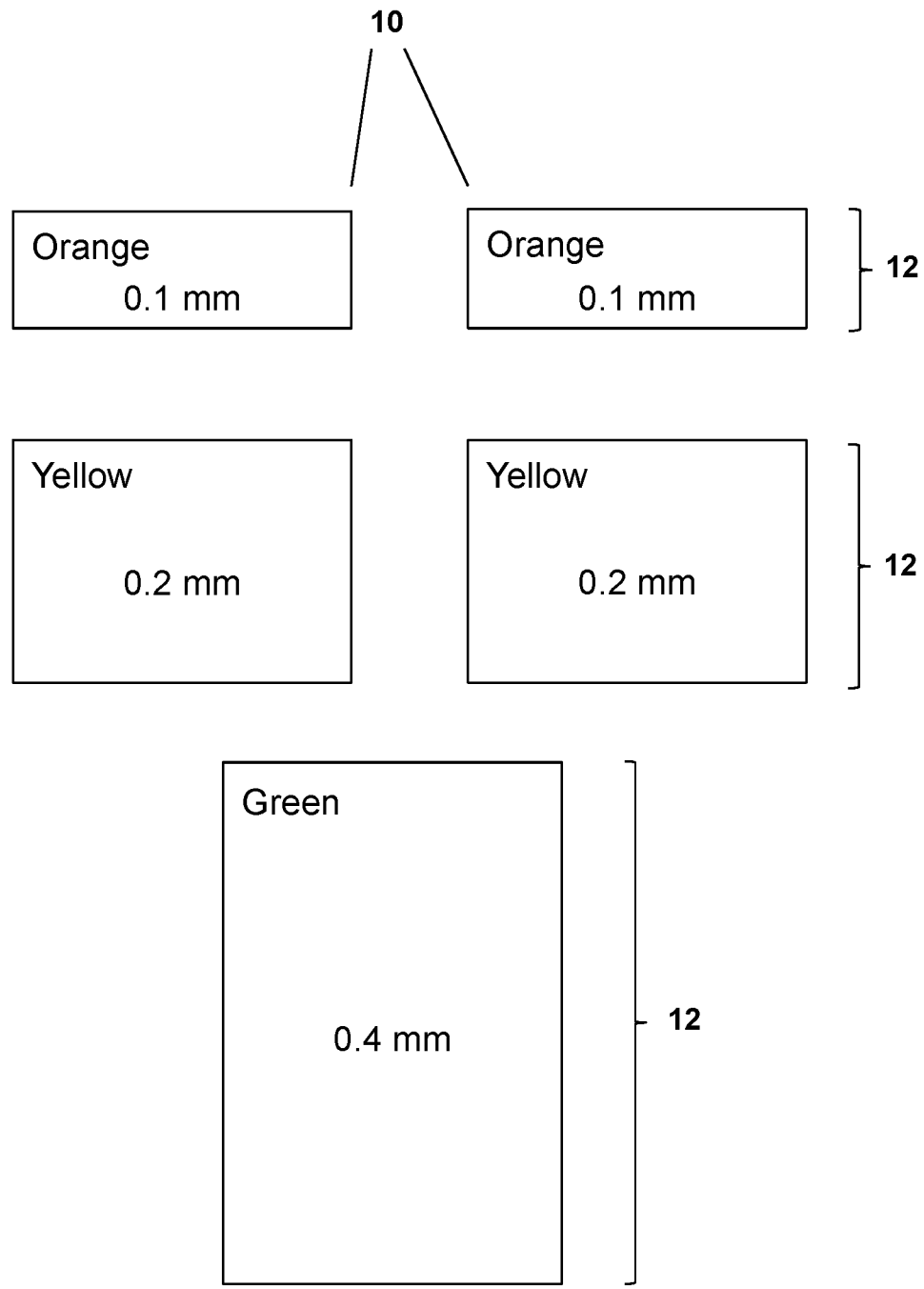
FIG. 3 is a diagram showing a gap-establishing kit described herein, with each kit component (each gap-establishing element) being color-coded and exhibiting a variable set of gap-forming dimensions.
Figure 4:
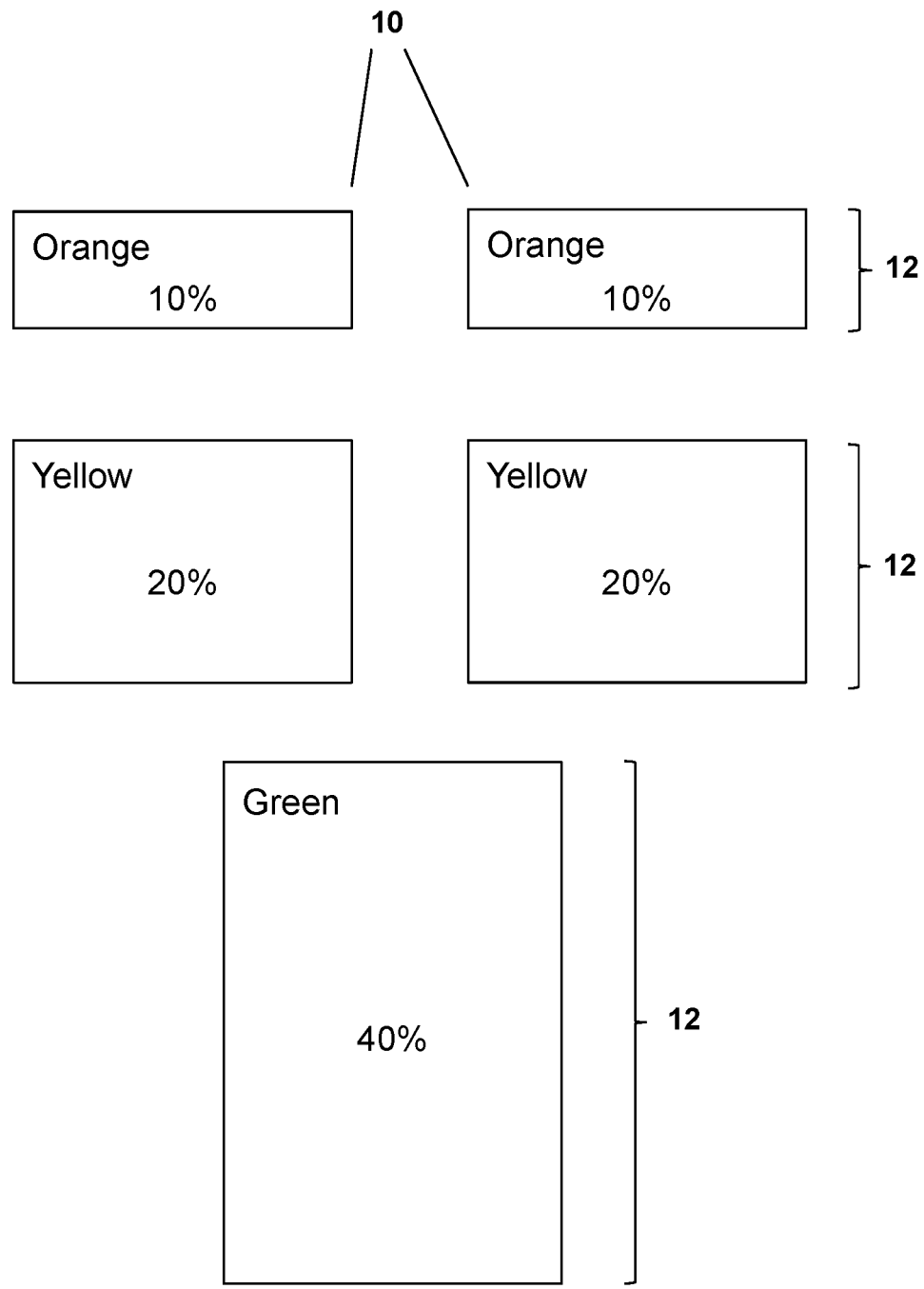
FIG. 4 is a diagram showing a gap-establishing kit described herein, with each kit component (each gap-establishing element) being color-coded and exhibiting a relative percentage of a particular gap dimension (a percentage of a desired target gap).

According to certain preferred embodiments, the invention provides that the plurality of gap-establishing elements 10 may exhibit (and be labeled with) an equal thickness 12 (FIG. 2). In additional embodiments, the invention provides that the plurality of gap-establishing elements 10 may exhibit (and be labeled with) variable thicknesses 12 (FIG. 3). Still further, in yet other embodiments, the invention provides that the plurality of gap-establishing elements 10 may exhibit (and be labeled with) a multitude of different thicknesses 12, with each thickness representing a relative percentage of a desired/target gap dimension (FIG. 4), such as 10%, 20%, 30%, 40%, 50%, 60%, 70%, 80%, 90%, or 100% of the desired gap dimension (or further increments thereof). For example, in this last embodiment, if the desired/target dimension is 10 mm, a gap-establishing element 10 labeled with 40% would have a thickness 12 of 4 mm. Although the present specification and Figures refer to measurements based on the metric system—i.e., the International System of Units—the invention provides that other measurement systems may be employed as well, such as the imperial system, the United States customary units, and other systems and dimensions that are tailored for specific industries and/or applications (and, of course, the measurements may further include subparts, e.g., 0.5 mm, 0.5 inch, etc.).

The invention provides that the gap-establishing elements 10 may be selectively removed from, or added to, a stack of such elements 10, to provide for rapid measurement, target gap establishment, and targeted gap adjustments. The gap-establishing elements 10 preferably exhibit a dimension (namely, a total length 16) that extends over the entire (or at least a majority of the) length of the gap to be formed. For example, if the target gap between two surfaces spans a length of 10 mm, it would be desirable for the entire length 16 of the gap-establishing element 10 to be at least 5 mm (50%) or, preferably, at least 7 mm (70%) or, more preferably, at least 9 mm (90%) or, still more preferably, 10 mm (100%). Such configuration minimizes error and allows the gap-establishing elements 10 to be securely placed between two surfaces (to form the desired/target gap) in a stabilized manner.

According to yet further embodiments, the invention provides that the gap-establishing elements 10 may exhibit a unique color-coding scheme (FIGS. 3-4), with each color being correlated with a specific dimension/thickness 12

Figure 5:
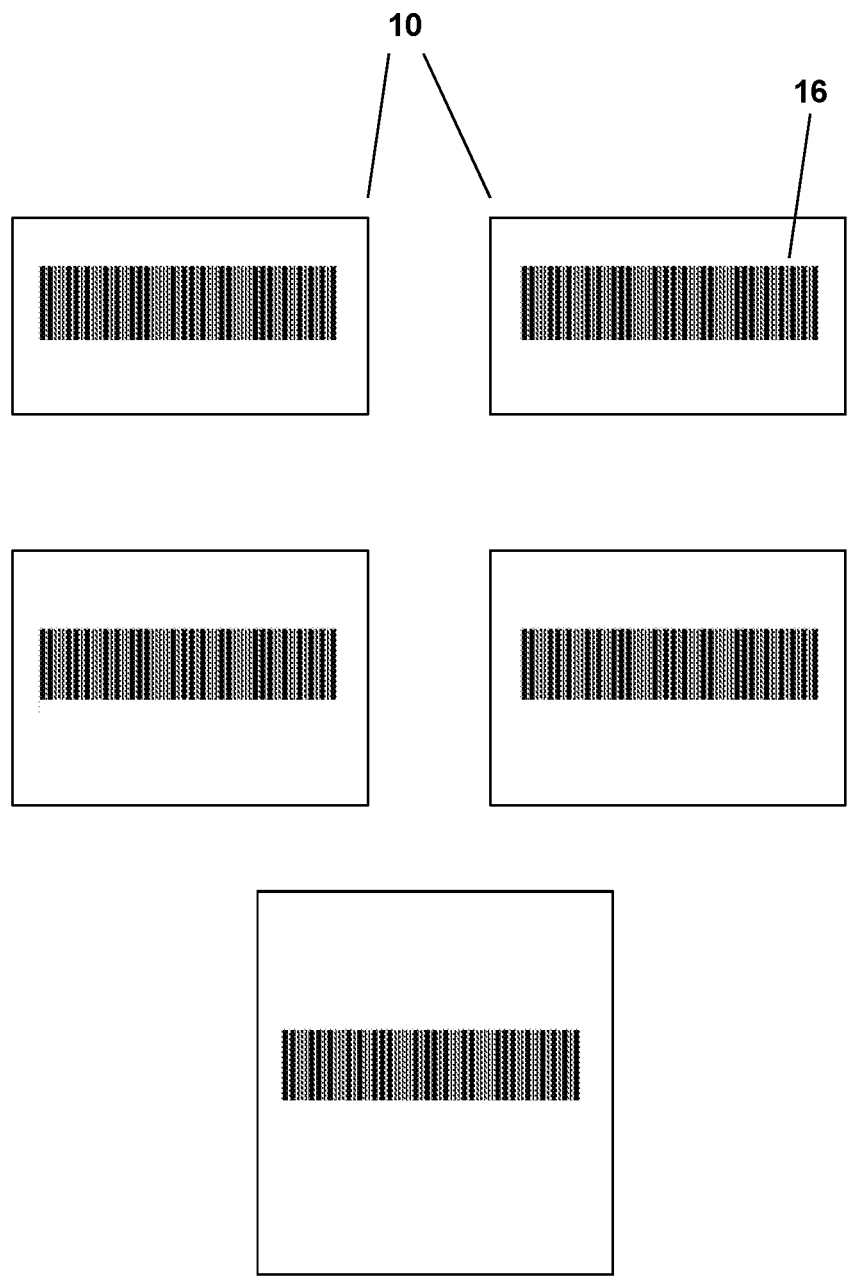
FIG. 5 is a diagram showing a gap-establishing kit described herein, with each kit component (each gap-establishing element) being bar-coded, with each bar code being correlated with a certain gap-forming dimension.
Figure 6:
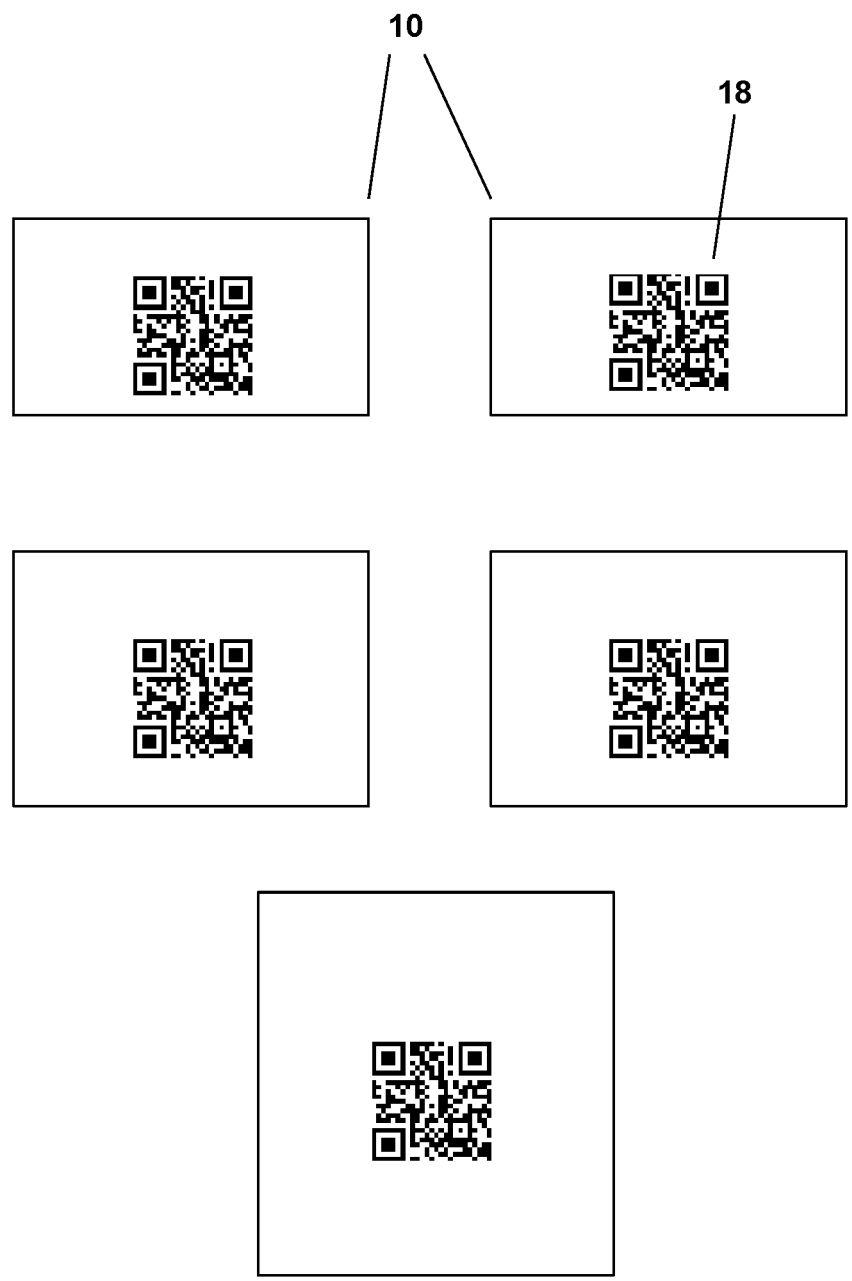
FIG. 6 is a diagram showing a gap-establishing kit described herein, with each kit component (each gap-establishing element) exhibiting a quick reference (QR) code, with each QR code being correlated with a certain gap-forming dimension.
Figure 7:
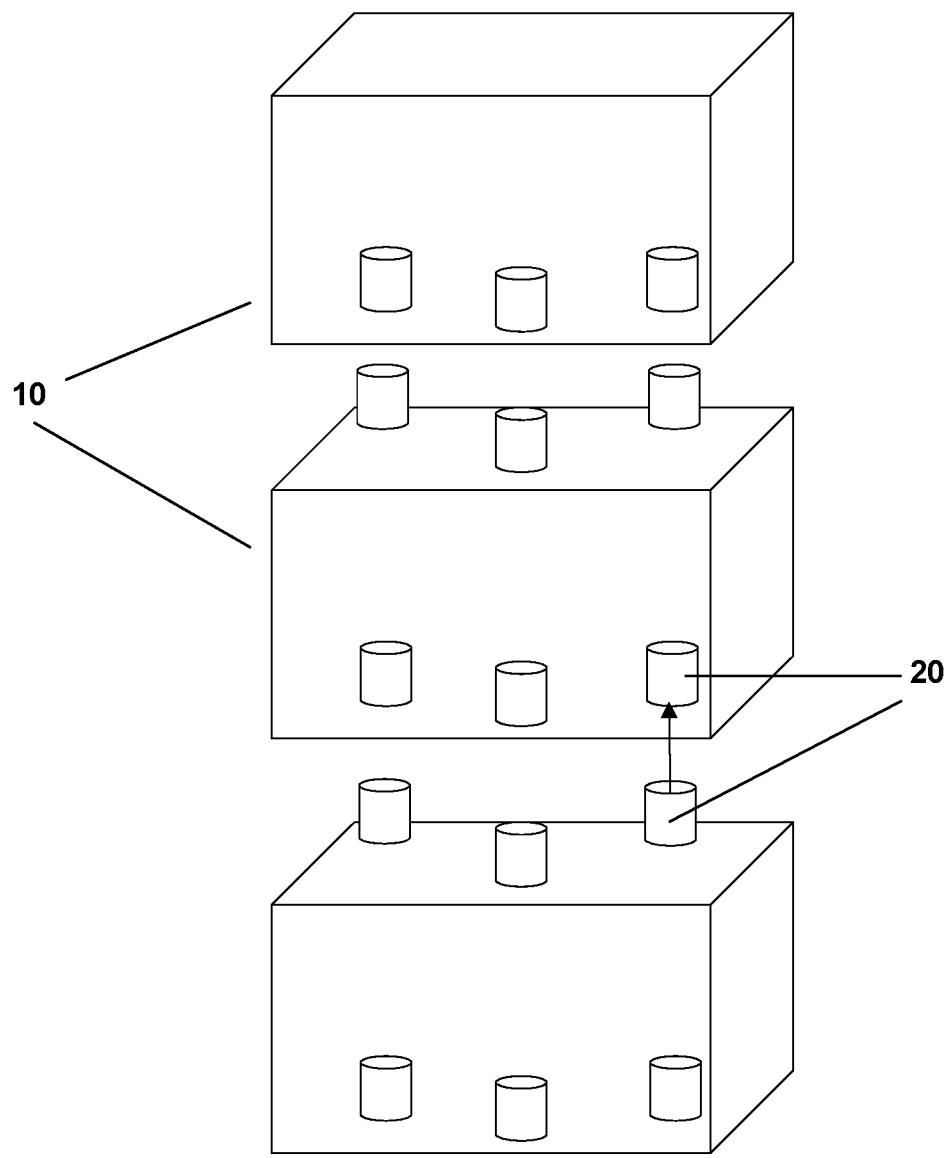
FIG. 7 is a diagram showing a gap-establishing kit described herein, with each kit component (each gap-establishing element) including interlocking and indexed male/female mechanical parts.
Figure 8:
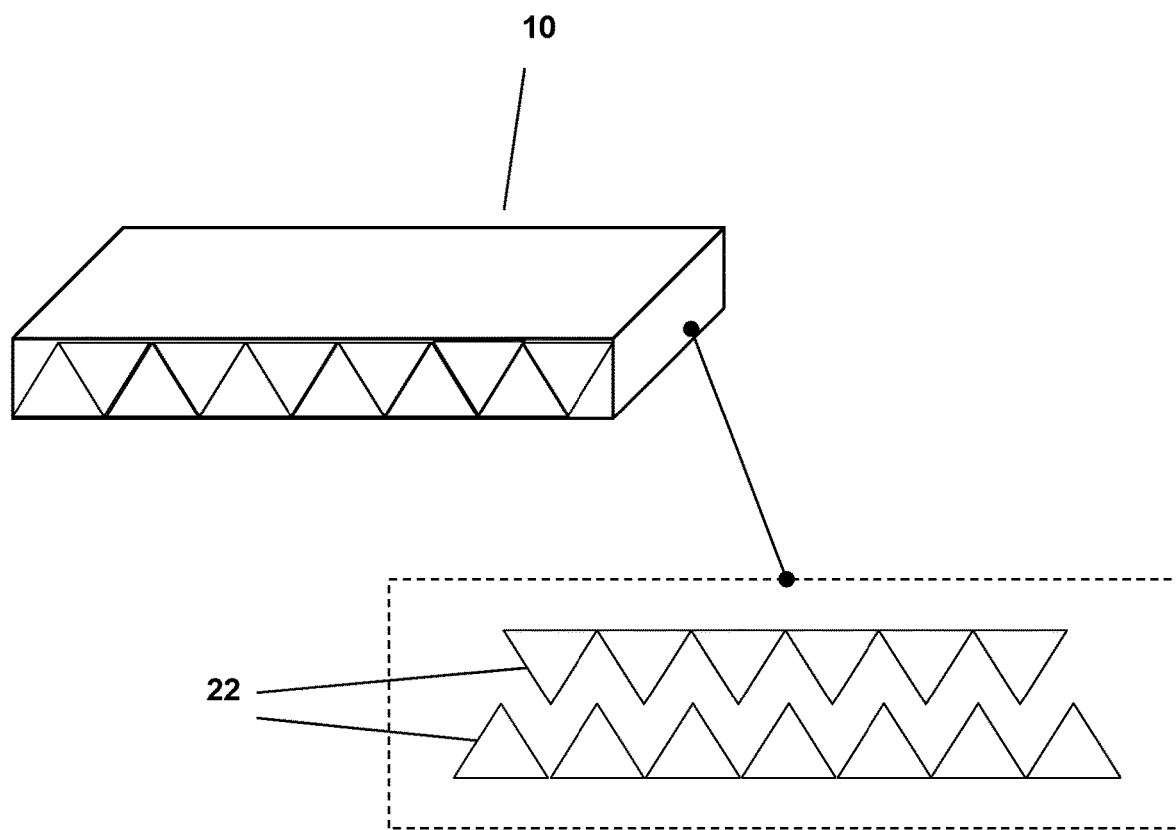
FIG. 8 is a diagram showing gap-establishing elements described herein, which includes interlocking elements on the surfaces to be joined between such elements.

(FIG. 3) and/or percentage of a desired/target gap (FIG. 4), to facilitate quick visualization of the gap thickness 12 that applies to each gap-establishing element 10. In other embodiments, the invention provides that each gap-establishing element 10 may exhibit a unique machine-readable code, such as a bar code 16 (i.e., linear bar codes) and/or QR code 18 (i.e., matrix bar codes), with each bar code 16 and/or QR code 18 being correlated with a certain gap-forming dimension or thickness 12 (FIGS. 5 and 6). Such embodiments enable gaps to be established by machine assembly equipment and related computing devices—e.g., within an industrial/commercial manufacturing setting.

As mentioned above, in certain embodiments, the plurality of gap-establishing elements 10 are designed and configured to be stacked upon (or connected to) each other, to achieve the desired/target gap dimension. For example, if a kit of gap-establishing elements 10 includes two 0.2 mm gap-establishing elements 10, but not a 0.4 mm gap-establishing element 10, the invention provides that the two 0.2 mm gap-establishing elements 10 may be combined to achieve the desired/target gap dimension of 0.4 mm. The invention provides that such gap-establishing elements 10 may be reversibly combined—or, in other embodiments, permanently combined. For example, the gap-establishing elements 10 may be combined via strong (or light) adhesives; the elements 10 may be combined through indexed male/female connecting parts 20 (FIG. 7); the elements 10 may be combined through interlocking elements 22 on the surfaces to be joined (FIG. 8); magnets; and/or other mechanical, chemical, and/or electro-mechanical means.

The invention provides that the gap-establishing elements 10 described herein may be formed of various materials. For example, such gap-establishing elements 10 may be formed of paper, wood, plastics, elastomers, metals, natural or synthetic materials, and/or combinations of the foregoing.

EXAMPLES

Structural Applications/Simple Machines—Doors

There are many benefits and advantages provided by the devices and methods described herein. In many modern-day assemblies, it is common to utilize parts that are slightly undersized, insofar as a larger gap is typically more acceptable (and mechanically tolerated) than no gap (e.g., where overlapping components of a machine might occur). The gaps present in a basic door provide a good illustration of this phenomenon. In such an example, inadequate gaps between a door and the doorjamb will result in difficulty of operation, due to binding and interfering surfaces (which may prevent the door from completely opening and/or closing). For this reason, most door gaps are larger than necessary, to ensure that the door can be opened and closed without interference. However, this tendency to overcompensate produces other undesirable results, such as poor (noise and air) insulation, particularly with exterior doors (where proper gap dimensions are critically important for heating, cooling, and energy concerns).

To further complicate matters, establishing proper gap dimensions in a door assembly is not as straightforward as one might assume. That is, depending on the hinge design and placement, the door thickness, the doorjamb dimensions, and other variables, the gaps that should exist around the perimeter of the door (when closed) vary. For example, the gap that should exist on the hinge side of a door is often different from the gap that should exist on the side that opens. Accordingly, the invention provides that a gap-establishing kit of the present invention would facilitate rapid and accurate visualization, establishment, and adjustment of the various gaps that should exist around the perimeter of the door, such as during installation of a door. More particularly, such kits may include dedicated gap-establishing elements 10 (as described herein), with a first gap-establishing element 10 being appropriate for the gap located on the hinge side of a door (between the door and doorjamb); a second gap-establishing element 10 being appropriate for the gap that should exist adjacent to the open side of the door; a third gap-establishing element 10 being appropriate for the gap that should exist between a top surface of the door and the top of the door frame; and a fourth gap-establishing element 10 being appropriate for the gap that should exist between a bottom surface of the door and the floor surface. In such example, each of the first, second, third, and fourth gap-establishing element 10 may be packaged together as a kit—and subsequently held together in a dedicated container.

Structural Applications/Simple Machines—Automobile Panels

Figure 9:
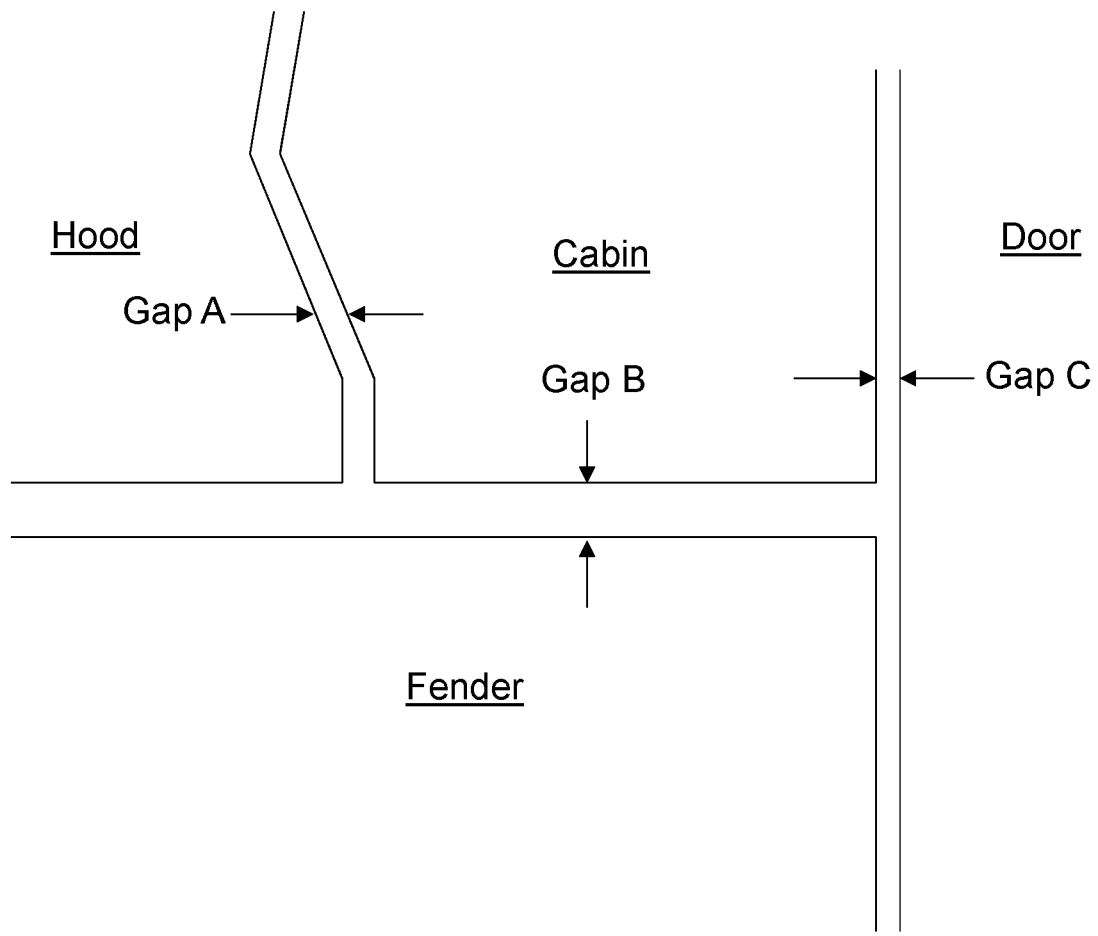
FIG. 9 is a diagram that illustrates the desired gaps between various surfaces and components of an automobile, including the gaps that exist between the hood, fender, cabin, and door of an automobile.

For the sake of further illustration, the devices and methods of the present invention may further be used to measure gap dimensions prior to disassembly of parts of a structure or machine (such that the same gap dimensions may be re-established during reassembly). Such procedures are common in maintenance, service, and restorations of simple and complex machines—a good example being the disassembly and re-assembly of automobiles (and components thereof), such as older/classic automobiles. In such procedures, it can be extremely challenging to replace/reposition the components of an assembly (such as the surfaces of an automobile), in the same orientation as before. As such, when using the devices and methods of the present invention, prior to disconnecting the hood, fender, cabin, and door of an automobile, the gaps that exist between those components/surfaces (as illustrated in FIG. 9) can be measured using the gap-establishing elements 10 described herein, e.g., by identifying a gap-establishing element 10 (from a plurality of gap-establishing elements 10) that securely and fittingly may be placed between two particular surfaces, e.g., between the hood and cabin (Gap A); hood and fender (Gap B); between the cabin and fender (Gap B); and between the door and the cabin)(Gap C)(FIG. 9). As such, when the parts of the automobile are later re-assembled, the gap-establishing elements 10 that were previously identified to be appropriate for each of such gaps, e.g., Gaps A, B, and C in FIG. 9, may be used to re-establish and set the appropriate gap dimension between each such surfaces.

Although illustrative embodiments of the present invention have been described herein, it should be understood that the invention is not limited to those described, and that various other changes or modifications may be made by one skilled in the art without departing from the scope or spirit of the invention.

What is claimed is:

1. A kit for measuring and establishing a gap between two surfaces, wherein the kit comprises a plurality of gap-establishing elements, wherein:
   (a) each gap-establishing element consists of a three-dimensional object having a defined and consistent thickness across an area that spans at least a partial length of the three-dimensional object;
   (b) each gap-establishing element is labeled with a number that is correlated with the defined and consistent thickness that applies to such gap-establishing element; and (c) the plurality of gap-establishing elements are configured to be stacked upon or combined with each other, wherein:
  (i) the plurality of gap-establishing elements includes two or more gap-establishing elements, with at least a first gap-establishing element having a different thickness across the area that spans at least a partial length of the three-dimensional object from the thickness of a second gap-establishing element; and
  (ii) each gap-establishing element is labeled with a unique machine-readable code, wherein each unique machine-readable code is correlated with a single defined and consistent thickness of the gap-establishing element.

2. The kit of claim 1, wherein each gap-establishing element is color-coded, such that each unique color is correlated with the single defined and consistent thickness of the gap-establishing element.

3. The kit of claim 1, wherein:
  (a) the thickness across an area that spans at least a partial length of the three-dimensional object of the first gap-establishing element is configured to be identical to a first target gap between a first set of surfaces of an automobile; and
  (b) the thickness across an area that spans at least a partial length of the three-dimensional object of the second gap-establishing element is configured to be identical to a second target gap between a second set of surfaces of an automobile.

4. The kit of claim 1, wherein the plurality of gap-establishing elements include gap-establishing elements having different thicknesses across the area that spans at least a partial length of the three-dimensional object, with each thickness representing a defined relative percentage of a target gap dimension.

5. The kit of claim 4, wherein each gap-establishing element is color-coded, such that each unique color is correlated with a single relative percentage of the target gap dimension.

6. The kit of claim 1, wherein the plurality of gap-establishing elements are configured to be stacked upon or combined with each other through one or more means selected from the group consisting of:
  (a) adhesives;
  (b) indexed male and female connecting parts;
  (c) interlocking elements on surfaces of each gap-establishing element to be joined; and
  (d) magnets.

7. A kit for measuring and establishing a gap between two surfaces, wherein the kit comprises a plurality of gap-establishing elements, wherein:
  (a) each gap-establishing element consists of a three-dimensional object having a defined and consistent thickness across an area that spans at least a partial length of the three-dimensional object;
  (b) each gap-establishing element is labeled with a number that is correlated with the defined and consistent thickness that applies to such gap-establishing element; and
  (c) the plurality of gap-establishing elements are configured to be stacked upon or combined with each other, wherein:
    (i) the plurality of gap-establishing elements include gap-establishing elements having different thicknesses across the area that spans at least a partial length of the three-dimensional object, with each thickness representing a defined relative percentage of a target gap dimension; and
    (ii) each gap-establishing element is labeled with a unique machine-readable code, such that each unique machine-readable code is correlated with a single relative percentage of the target gap dimension.

8. A kit for measuring and establishing a gap between two surfaces of an automobile, wherein the kit comprises a plurality of gap-establishing elements, wherein:
  (a) each gap-establishing element consists of a three-dimensional object having a defined and consistent thickness across an area that spans at least a partial length of the three-dimensional object;
  (b) each gap-establishing element is labeled with a number that is correlated with the defined and consistent thickness that applies to such gap-establishing element, wherein:
    (i) each of the gap-establishing elements exhibits an identical thickness across the area that spans at least a partial length of the three-dimensional object; or
    (ii) the plurality of gap-establishing elements includes two or more gap-establishing elements, with at least a first gap-establishing element having a different thickness across the area that spans at least a partial length of the three-dimensional object from the thickness of a second gap-establishing element; and
  (c) the plurality of gap-establishing elements are configured to be stacked upon or combined with each other, wherein each gap-establishing element and defined combinations of such gap-establishing elements are configured to be identical to one or more target gaps between two or more surfaces of an automobile, wherein each gap-establishing element is labeled with a machine-readable code, such that each unique machine-readable code is correlated with a single defined and consistent thickness of the gap-establishing element.

9. The kit of claim 8, wherein each gap-establishing element is color-coded, such that each unique color is correlated with the single defined and consistent thickness of the gap-establishing element.

10. The kit of claim 8, wherein the plurality of gap-establishing elements are configured to be stacked upon or combined with each other through one or more means selected from the group consisting of:
  (a) adhesives;
  (b) indexed male and female connecting parts;
  (c) interlocking elements on surfaces of each gap-establishing element to be joined; and
  (d) magnets.

* * * * *